United States Patent
Jung et al.

(10) Patent No.: US 8,658,462 B2
(45) Date of Patent: Feb. 25, 2014

(54) METHOD OF FORMING TIO$_2$ ARRAY USING ZNO TEMPLATE

(75) Inventors: Mi Hee Jung, Daejeon (KR); Man Gu Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 281 days.

(21) Appl. No.: 13/292,108

(22) Filed: Nov. 9, 2011

(65) Prior Publication Data

US 2012/0135597 A1    May 31, 2012

(30) Foreign Application Priority Data

Nov. 30, 2010  (KR) .................. 10-2010-0120940

(51) Int. Cl.
    *H01L 21/00*    (2006.01)
(52) U.S. Cl.
    USPC .......................... 438/104; 438/780
(58) Field of Classification Search
    USPC .................. 438/104, 780–782
    See application file for complete search history.

(56) References Cited

U.S. PATENT DOCUMENTS

| | | | |
|---|---|---|---|
| 2010/0167460 A1* | 7/2010 | Yane | 438/85 |
| 2011/0220887 A1* | 9/2011 | Wang et al. | 257/43 |
| 2013/0011958 A1* | 1/2013 | Roscheisen et al. | 438/85 |

FOREIGN PATENT DOCUMENTS

| | | |
|---|---|---|
| JP | 2009-535803 A | 10/2009 |
| KR | 10-2010-0022859 A | 3/2010 |

OTHER PUBLICATIONS

Noriko Saito et al., "Low-Temperature Fabrication of Light-Emitting Zinc Oxide Micropatterns Using Self-Assembled Monolayers", Advanced Materials, vol. 14, No. 6, pp. 418-421, Mar. 18, 2002.
Jae-Young Lee et al., "Site and Morphology Controlled ZnO Deposition on Pd Catalyst Prepared from Pd/PMMA Thin Film Using UV Lithography", Chem. Mater., vol. 17, No. 22, pp. 5498-5503, Sep. 29, 2005.
Cheng Hung Wang et al., "Facile Solution Route to Vertically Aligned, Selective Growth of ZnO Nanostructure Arrays", Langmuir, vol. 23, No. 24, pp. 11960-11963, Oct. 17, 2007.
D. F. Liu et al., "Periodic ZnO Nanorod Arrays Defined by Polystyrene Microsphere Self-Assembled Monolayers", Nano Letters, vol. 6, No. 10, pp. 2375-2378, Sep. 23, 2006.

* cited by examiner

Primary Examiner — Richard Booth
(74) Attorney, Agent, or Firm — Rabin & Berdo, P.C.

(57) ABSTRACT

Provided is a method of forming a method of forming a titanium dioxide (TiO$_2$) array using a zinc oxide (ZnO) template. In the method, polymer nanopatterns are formed on the substrate, and monomolecular monolayers are formed between the polymer nanopatterns on the substrate. A seed layer pattern is formed between the monomolecular monolayers on the substrate, and a zinc oxide template is formed by growing zinc oxide on the seed layer.

9 Claims, 4 Drawing Sheets

METHOD OF FORMING TIO₂ ARRAY USING ZNO TEMPLATE

CROSS-REFERENCE TO RELATED APPLICATIONS

The present application claims priority to Korean patent application No. 10-2010-0120940, filed on Nov. 30, 2010 which is incorporated by reference in its entirety.

BACKGROUND OF THE INVENTION

The present invention relates to a method of forming a titanium dioxide ($TiO_2$) array using a zinc oxide (ZnO) template.

In order to increase the degree of integration in a semiconductor, a technology of patterning functional materials is absolutely required for nano or micro devices.

In general, a patterning process of ZnO is carried out in a vapor phase by using titanium (Ti), palladium (Pd), platinum (Pt), silver (Ag) and gold (Au) catalyst particle films formed on the surface of a substrate through radio frequency (RF) magneton sputtering and photolithography. Alternatively, ZnO is patterned by selectively forming a hydrophilic or hydrophobic functional group on the surface of a substrate through a method of using a polymer mold or a method of using a self assembly monolayer.

The aforesaid technological constitution belongs to a background technology introduced to help understand the present invention, and thus does not mean a prior art which has been well known in the art to the present invention pertains.

SUMMARY OF THE INVENTION

The conventional methods of patterning zinc oxide (ZnO) requires expensive catalysts, and has a temperature limitation in forming ZnO as a crystalline material because most of the materials used for masks are polymeric or monomolecular layers.

Embodiments of the present invention are directed to providing a method of manufacturing titanium dioxide ($TiO_2$) array using a ZnO template. Since a ZnO pattern in the present invention is formed in a liquid phase after forming a seed layer pattern using a polymer pattern which is formed through nanoimprinting or E-beam lithography, expensive catalysts are not required and there is no temperature limitation.

In one embodiment, a method of forming a titanium dioxide ($TiO_2$) array using a zinc oxide (ZnO) template includes: forming polymer nanopatterns on a substrate; forming monomolecular monolayers between the polymer nanopatterns on the substrate; forming a seed layer pattern between the monomolecular monolayers on the substrate; and forming a zinc oxide template by growing zinc oxide on the seed layer.

The polymer nanopattern of the present invention may be formed using a nanoimprinting method.

The forming of the polymer nanopattern may include: preparing a stamp by forming a pattern including a concave portion on a quartz plate; dispensing a resin after coating the substrate with polymer; and patterning the resin by pressing the stamp onto the substrate, and etching the polymer corresponding to the patterned resin.

The polymer of the present invention may be a polymethyl methacrylate (PMMA).

The polymer nanopattern of the present invention may be formed using an E-beam lithography system.

The substrate of the present invention may include any one selected from a group consisting of a gallium arsenide substrate, a silicon substrate, an indium tin oxide (ITO) substrate, a transparent glass and a flexible polymer substrate.

In the present invention, the forming of the zinc oxide template may include growing the zinc oxide on the seed layer in a precursor solution.

In the present invention, the forming of the zinc oxide template may include: annealing the seed layer to form zinc oxide crystal; and inhibiting growth of the zinc oxide at the region without the seed layer by treating the substrate with oxygen plasma.

In the present invention, the method of forming the titanium dioxide ($TiO_2$) array may further include removing ZnO after forming a titanium dioxide on the surface of the zinc oxide of the zinc oxide template.

DESCRIPTION OF SPECIFIC EMBODIMENTS

Hereinafter, a method of forming a titanium dioxide ($TiO_2$) array using a zinc oxide (ZnO) template in accordance with the present invention will be described in detail with reference to the accompanying drawings.

In the figures, the thickness of lines illustrated on the drawings and the size of components may be exaggerated for clarity and convenience of illustration. In addition, terms used in this disclosure are defined considering their functions in the present invention, and may vary according to intentions of users or operators and to practices. Therefore, definitions of the terms used in this disclosure should be understood based on the overall inventive concept of the present disclosure.

Figure 1:
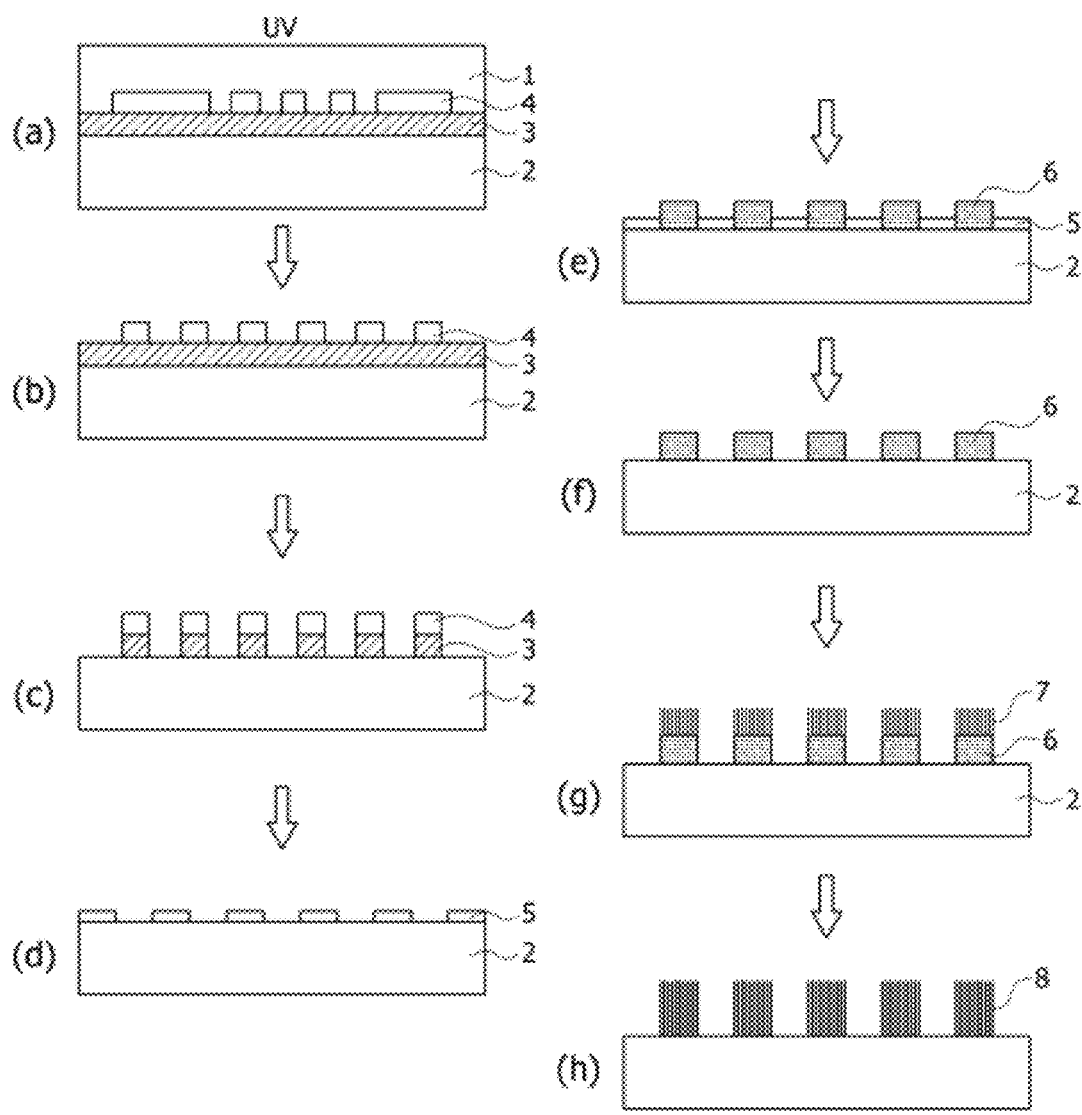
FIG. 1 illustrates a method of forming a titanium dioxide ($TiO_2$) array using a zinc oxide (ZnO) template formed by nanoimprinting according to an embodiment of the present invention.

FIG. 1 illustrates a method of forming a titanium dioxide array using a ZnO template formed through nanoimprinting according to an embodiment of the present invention.

FIG. 1 illustrates a process of selectively patterning a ZnO seed layer by forming a silane self-assembly monolayer using a polymethyl methacrylate (PMMA) pattern formed through nanoimprinting. Specifically, FIG. 1 illustrates schematic layouts in which a pattern is formed by treating a substrate with oxygen plasma to allow, a ZnO to grow in a region where a seed layer is disposed, and then a titanium dioxide nanotube is formed using the pattern.

In the present embodiment, forming of a $TiO_2$ nanotube includes: forming a polymer pattern formed via nanaoimprinting up to the desired size of a ZnO pattern through an etching process; forming a monomolecular layer in the formed polymer pattern; removing the polymer pattern; coating a ZnO seed layer on the monomolecular layer; forming a crystalline ZnO through an annealing process; oxidizing a region where the ZnO seed layer is not formed through $O_2$ plasma treatment to thereby inhibit the growth of ZnO and promote the growth of ZnO only in a region where the seed layer exists; growing ZnO by allowing the substrate with the patterned ZnO seed layer to float on a precursor solution; and soaking the ZnO-formed substrate in the titanium dioxide precursor solution to form the titanium dioxide nanotube.

In other words, according to an embodiment, a $TiO_2$ dioxide nanotube is formed by forming a polymethyl methacrylate (PMMA) line pattern used as a photoresist through nanoimprinting, and forming a ZnO pattern using a seed layer pattern.

To begin with, a stamp 1 was produced to form a polymer pattern through a nanoimprinting method. The stamp 1 has a pattern having fine lines, and the pattern has the form of a dot or line. The pattern may be 20 nm to 30 nm in diameter in case of the dot form, and about 20 nm~30 nm of distance between the lines in case of the line form. The polymer nanopattern may also be formed using an E-beam lithography system. Hereinafter, description will be focused on a method of forming a polymer nanopattern using nanoimprinting technique.

Referring to FIGS. 1(a) and (b), to form the stamp 1, a chrome layer having a certain thickness was formed on a transparent quarts plate, and a photoresist was coated on the chrome layer to form a pattern through E-Beam lithography. After then, the quarts plate coated with chrome was etched to form a desired pattern. Finally, the chrome layer was completely removed to form the stamp 1. The chrome layer is an adhesion layer to attach the photoresist.

Prior to an imprinting process, the stamp was treated with piranha ($H_2SO_4:H_2O_2=3:1$ vol. %) for 30 minutes to remove organic matters. In order to neutralize the adhesion force between the stamp 1 and resin 4, the surface of the stamp 1 was SAM (self assembly monolayer)-treated in a vapor phase to coat tridecafluoro-1,1,2,2, tetrahydrooctyl trichlorosilane [$CH_3$—$(CH_2)_5$—$CH_2$—$CH_2SiCl_3$].

Polymethyl methacrylate (PMMA, 950K A2) 3 was spin-coated on a silicone substrate 2 to a thickness of 100 nm. The substrate may include gallium arsenide (GaAS), silicone, indium tin oxide (ITO), transparent glass and flexible polymer. In this disclosure, the silicone substrate 2 is mostly being explained.

To transfer the pattern of the stamp 1 to the substrate 2, a resin 4 mixed with acrylic-based monomer and an initiator was dispensed at 36 spots on the substrate with 100 picoliter per spot. When the resin 4 is patterned by pressing the stamp 1 onto a PMMA photoresist 3 with the resin 4 dispensed, the resin 4 pressed onto a protrusion of the stamp 1 is pushed into a concave portion of the stamp 1. Here, UV with the wavelength of 365 nm was irradiated for 120 seconds through the transparent stamp 1 so as to cure the resin 4.

Referring to FIG. 1(c), after completing curing, the stamp 1 was removed and the PMMA layer 3 and the resin layer 4 still remaining between the patterns were treated using ICP (inductively coupled plasma) etching equipment under the conditions of 50 W of power, 30 mtorr of pressure and 20 sccm of $O_2$ flow rate. The stamp 1 was removed by varying a treating time depending on the thickness of the remaining PMMA layer 3. Since the size of the polymer pattern formed through nanoimprinting may be adjusted by the etching process, the size of the polymer pattern does not depend on the size of patterns of the mold used in the imprinting process.

Referring to FIG. 1(d), octadecyltrichlorosilane self assembly monolayer (OTS SAM) 5 was formed on the silicone substrate 2 using the PMMA polymer template which was formed already. The OTS SAM 5 was formed by immerging the substrate for 3 hours in a $N_2$ glove box containing a mixed solution of hexadecane:chloroform (4:1 vol. %) at a $5 \times 10^{-3}$M of concentration of OTS. And then, 120° C. of heat was applied to a hot plate for 10 minutes to accomplish a siloxane bond between the end-group of OTS molecules and the substrate. Thereafter, the PMMA formed through imprinting was removed by an ultrasonic cleanser in acetone for 5 minutes. An experiment of ZnO patterning was conducted using the monomolecular layer formed on the substrate. Following is a detailed explanation on the present invention.

Figure 4:
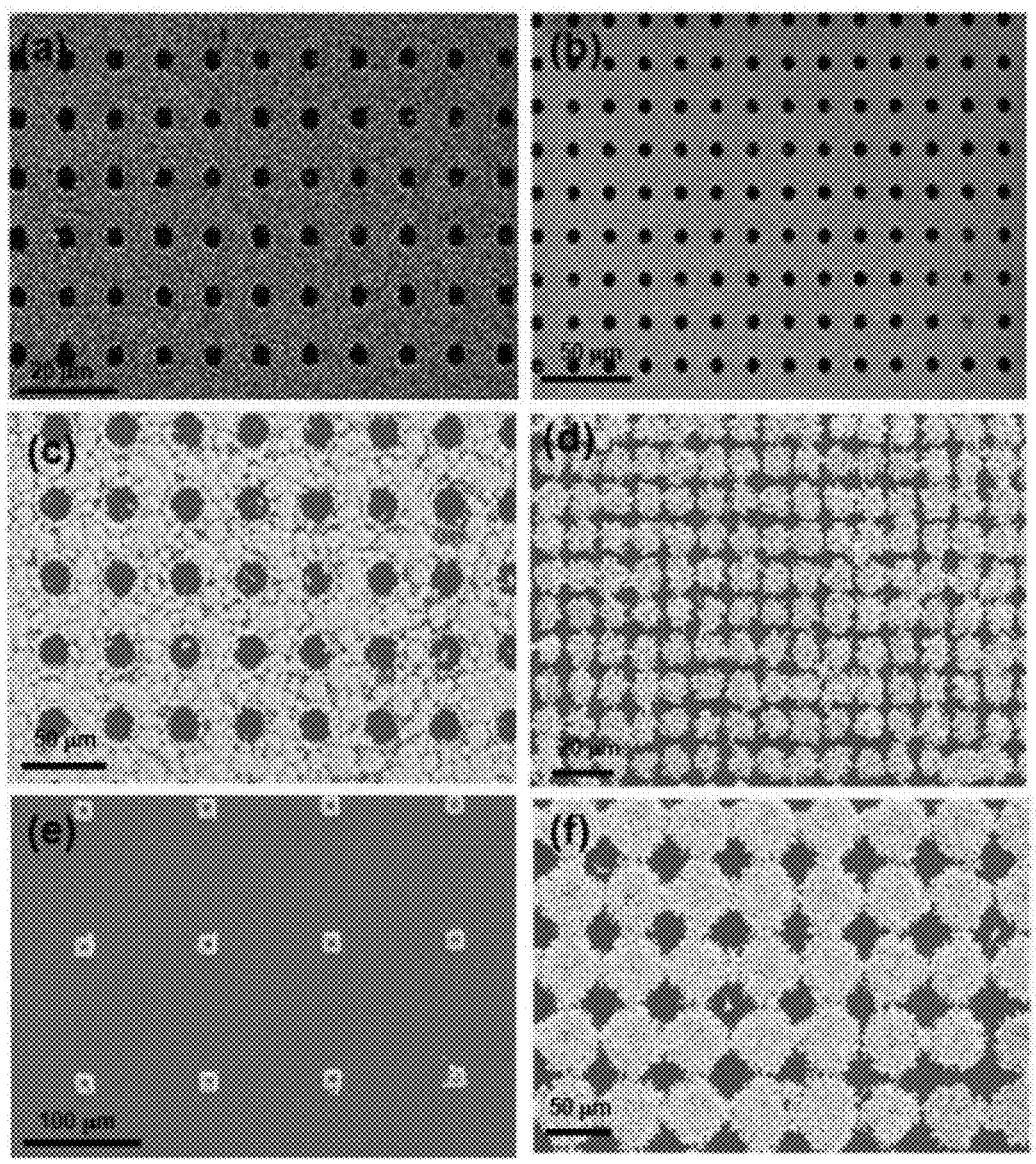
FIG. 4 illustrates an electron micrograph of patterned ZnO by size according to an embodiment of the present invention.

Referring to FIG. 1(e), 4.39 g of zinc acetate dehydrate is dissolved in 100 ml of mixed organic solvent of methanol and 2-methoxyethanol at the ratio of 1:1 in order to prepare 0.2 M of zinc acetate dehydrate to be used as a seed layer 6.

The prepared seed layer 6 is coated on the substrate with the silane monomolecular layer 5 for 30 seconds at 5000 rpm and then, is heated on a hot plate at 80° C. for 10 minutes to remove the organic solvent. The above-described process is repeated 3 to 5 times. The seed layer 6 is selectively coated. This means that parts of seed layer formed with the monomolecular layer of methyl group (—CH3) is not coated but only the hydrophilic parts of seed layer formed with the monomolecular layer of hydroxy group (—OH) is coated.

Referring to FIG. 1(f), after annealing the substrate coated with the seed layer 6 at 300° C. for 1 hour to form ZnO crystal, the silane monomolecular layer 5 is dissolved and removed.

The substrate is treated with oxygen plasma under the conditions of 50 W of power, 30 mtorr of pressure and 20 sccm of $O_2$ flow rate for 5 minutes to oxidize the surface of the substrate, and thus inhibit the growth of ZnO on the substrate excluding the parts of ZnO seed layer.

In order to prepare a precursor solution, 0.93 g of 0.0125 M zinc nitrate hexahydrate and 0.44 g of hexamethylenetetramine (HMTA) are dissolved in 250 ml of deionized water.

Referring to FIG. 1(g), the substrate coated with seed layer 6 is made to float on the precursor solution with the coated surface turned upside down to allow ZnO 7 to grow at 90° C. for 30 minutes to 4 hours (floating time). The grown ZnO 7 is rinsed with deionized water to remove sodium, and blown with nitrogen ($N_2$) to dry.

A method of growing $TiO_2$ nanotube 8 using ZnO which has grown on the substrate as a template will be described below with reference to FIG. 1(h).

The substrate with ZnO patterned is immerged in a solution of 0.075 M ammonium hexafluorotitanate (($NH_4)_2TiF_6$) and 0.2M boric acid ($H_3BO_3$) for 30 minutes to 2 hours. Meanwhile, ammonium hexafluorotitanate (($NH_4)_2TiF_6$) is hydrolyzed to form titanium dioxide on the surface of ZnO, and ZnO nanowire is dissolved by an acid solution prepared by ammonium hexafluorotitanate ($NH_4)_2TiF_6$.

The formed titanium dioxide (titanium dioxide) nanotube is immerged into a glycerol solution containing 3% of hydrofluoric (HF) acid and 12% of $H_{2O}$ for 2 minutes. The titanium dioxide nanotube is additionally immerged into 0.5 M boric acid ($H_{3B}O_3)_f$ or 1 hour to remove ZnO residues formed inside the titanium dioxide nanotube. The finally obtained titanium dioxide nanotube 8 is rinsed with DI, and annealed at 450° C. for 30 minutes to increase crystallinity.

Figure 2:
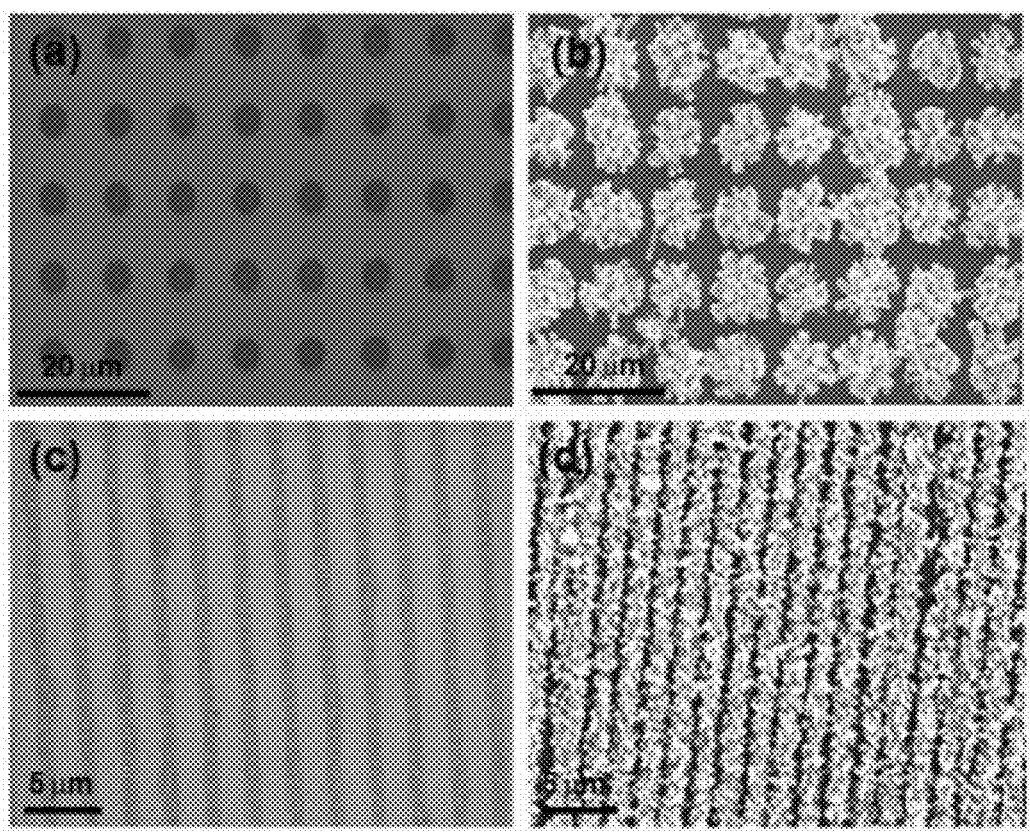
FIG. 2 illustrates an electron micrograph of patterned ZnO using a seed layer pattern according to an embodiment of the present invention.

FIG. 2 illustrates an electron micrograph of patterned ZnO using a seed layer pattern according to an embodiment of the present invention. Specifically, FIG. 2 illustrates an electron micrograph of ZnO grown only in a seed layer using a seed layer pattern according to an embodiment of the present invention. Referring to FIG. 2, seed layer patterns formed with dots and lines (a) and (c), and ZnO patterns (b) and (c) grown in a seed layer pattern are illustrated.

Figure 3:
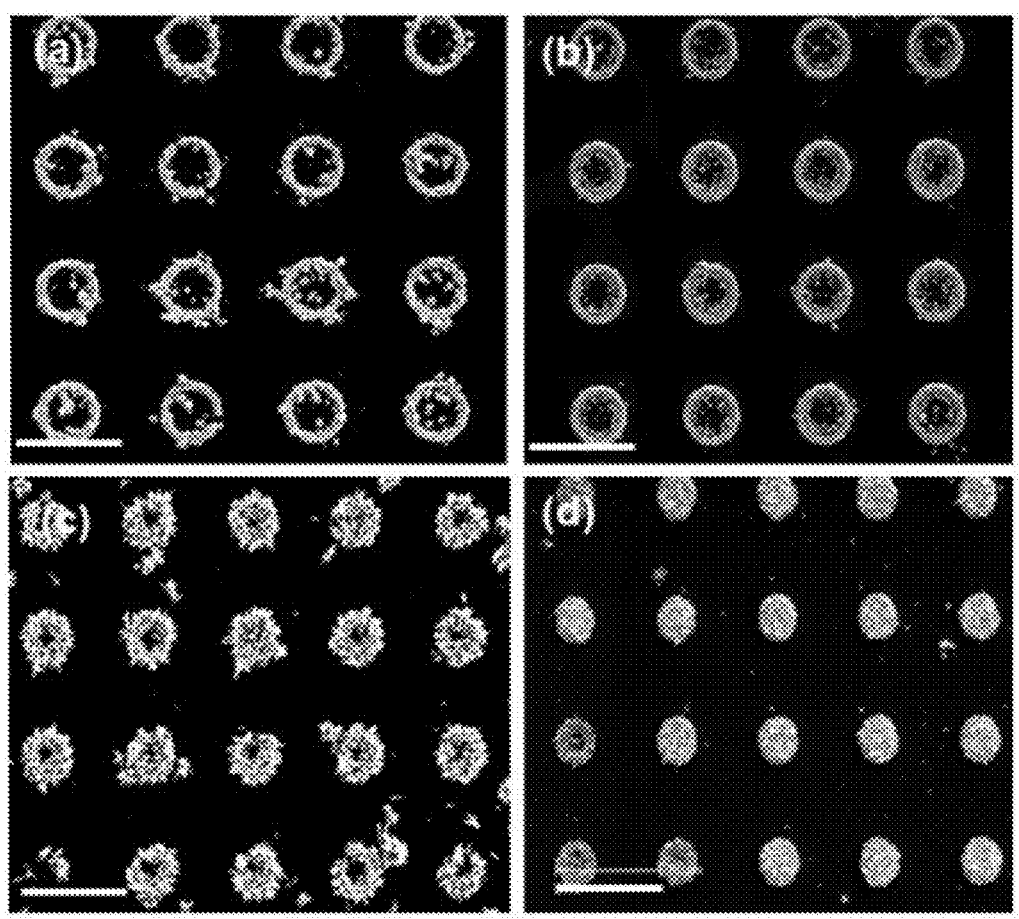
FIG. 3 illustrates an image of ZnO which is growing in a ring pattern in a seed layer according to an embodiment of the present invention.

FIG. 3 illustrates an image of ZnO growing to a ring pattern in a seed layer according to an embodiment of the present invention. Specifically, FIG. 3 illustrates that ZnO grows to a ring pattern in a seed layer. Referring to FIG. 3, the growth time is 15 minutes in FIG. 3(a), 30 minutes in FIG. 3(b), 1 hour in FIG. 3(c), 2 hours in FIG. 3(d), respectively, and the scale bar is 10 mm long.

FIG. 4 illustrates an electron micrograph of patterned ZnO by size according to an embodiment of the present invention. Specifically, FIG. 4 illustrates an electron micrograph of patterned ZnO having a size of about 3 um to 20 um. Referring to FIG. 4, the length and diameter of rods are 250-400 nm and 60-80 nm, respectively. FIGS. 4(a) to (c) show negative template patterns, and FIGS. 4(d) to (f) show positive template patterns.

Since the detailed method of forming a titanium dioxide array using a ZnO template formed through nanoimprinting according to the present invention is obvious to those skilled in the art, a detailed explanation is omitted.

According to the present invention, patterning of $TiO_2$ is performed by use of nanoimprinting or E-beam lithography, thereby mass-producing patterns simply up to nono scale and also saving process cost.

While the present invention has been described with respect to the specific embodiments, it will be apparent to those skilled in the art that various changes and modifications may be made without departing from the spirit and scope of the invention as defined in the following claims.

What is claimed is:

1. A method of forming a titanium dioxide ($TiO_2$) array using a zinc oxide (ZnO) template, the method comprising:
    forming polymer nanopatterns on a substrate;
    forming monomolecular monolayers between the polymer nanopatterns on the substrate;
    forming a seed layer pattern between the monomolecular monolayers on the substrate; and
    forming a zinc oxide template by growing zinc oxide on the seed layer.

2. The method of claim 1, wherein the polymer nanopattern is formed using a nanoimprinting method.

3. The method of claim 1, wherein the forming of the polymer nanopattern comprises:
    preparing a stamp by forming a pattern including a concave portion on a quartz plate;
    dispensing a resin after coating the substrate with polymer; and
    patterning the resin by pressing the stamp onto the substrate, and etching the polymer corresponding to the patterned resin.

4. The method of claim 3, wherein the polymer is a polymethyl methacrylate (PMMA).

5. The method of claim 1, wherein the polymer nanopattern is formed using an E-beam lithography system.

6. The method of claim 1, wherein the substrate comprises any one selected from a group consisting of a gallium arsenide substrate, a silicon substrate, an indium tin oxide (ITO) substrate, a transparent glass and a flexible polymer substrate.

7. The method of claim 1, wherein the forming of the zinc oxide template comprises growing the zinc oxide on the seed layer in a precursor solution.

8. The method of claim 1, wherein the forming of the zinc oxide template comprises:
    annealing the seed layer to form zinc oxide crystal; and
    inhibiting growth of the zinc oxide at the region without the seed layer by treating the substrate with oxygen plasma.

9. The method of claim 1, further comprising removing ZnO after forming a titanium dioxide on the surface of the zinc oxide of the zinc oxide template.

* * * * *